2,725,891

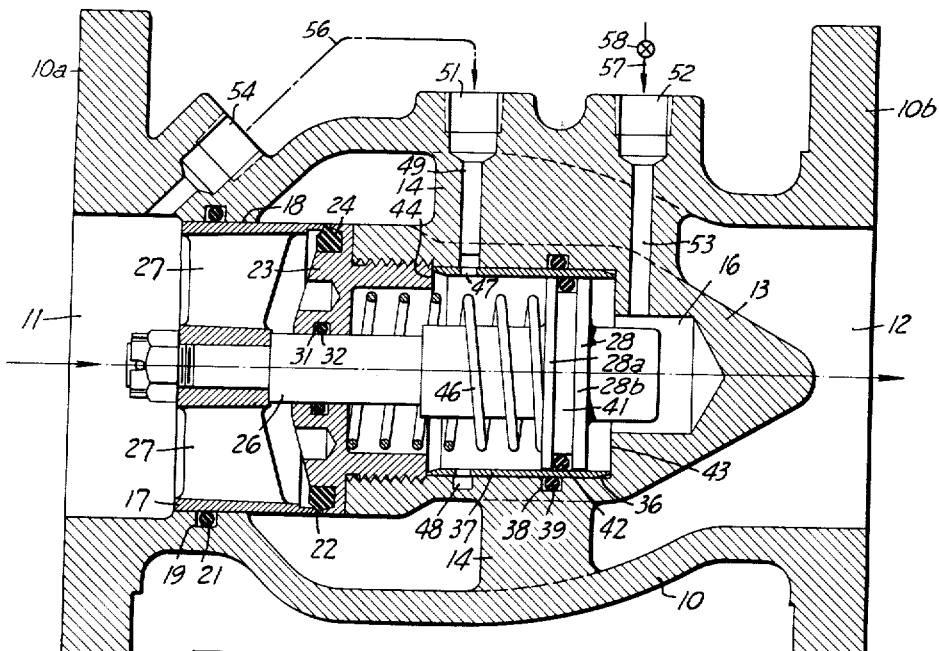
FIG_1_
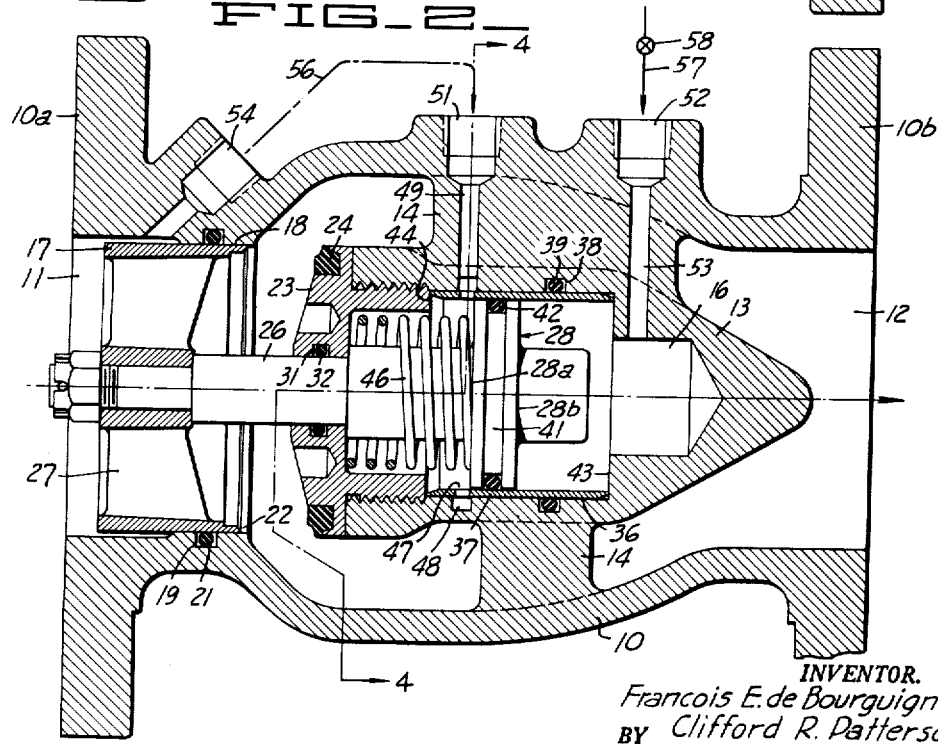
FIG_2_
INVENTOR.
Francois E. de Bourguignon
BY Clifford R. Patterson
ATTORNEYS Dec. 6, 1955        F. E. DE BOURGUIGNON ET AL        2,725,891
HYDRAULICALLY OPERATED VALVE
Filed Feb. 5, 1951                                    2 Sheets-Sheet 2
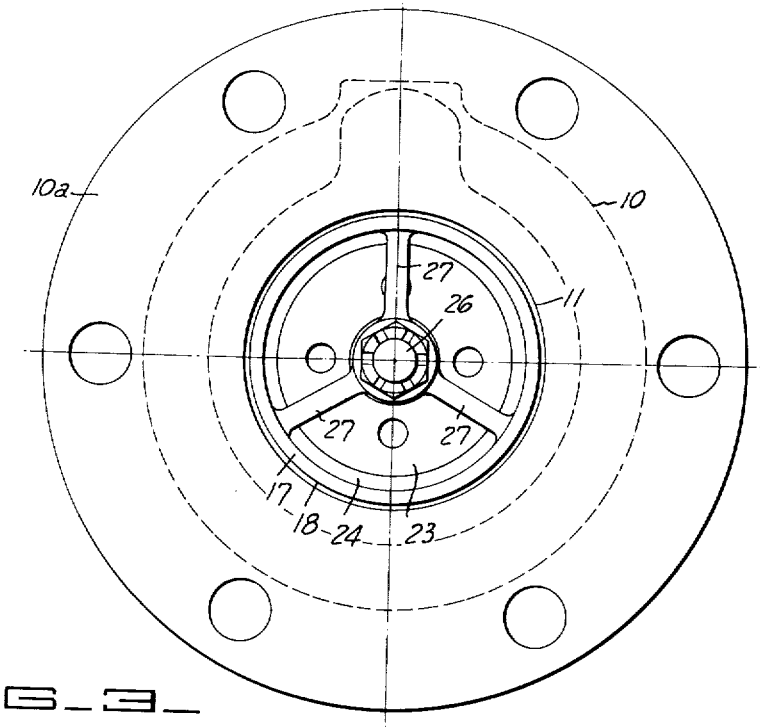
FIG_3_
FIG_4_
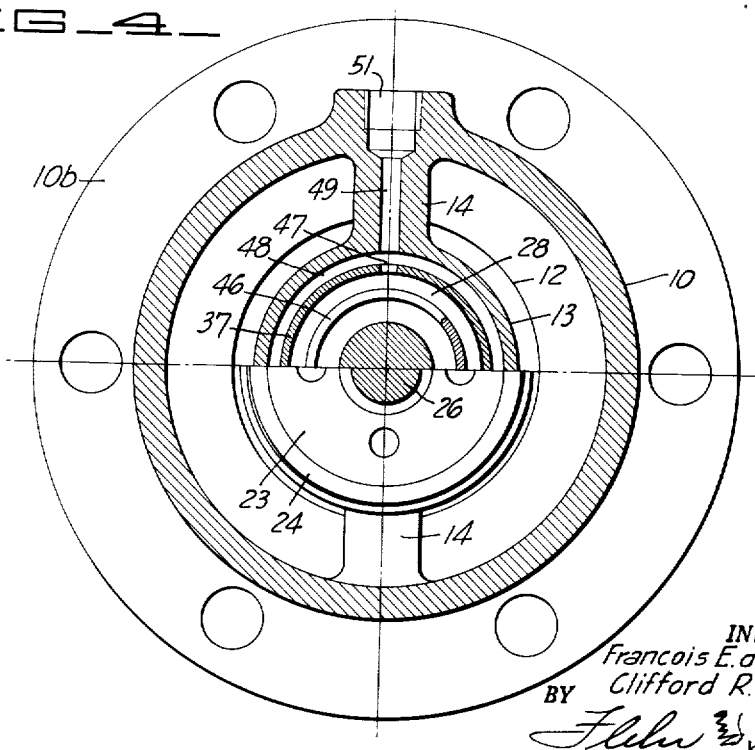
INVENTORS
Francois E. de Bourguignon
Clifford R. Patterson
BY
ATTORNEYS

United States Patent Office 2,725,891
Patented Dec. 6, 1955

HYDRAULICALLY OPERATED VALVE

Francois E. de Bourguignon and Clifford R. Patterson, San Jose, Calif., assignors, by mesne assignments, to Cardox Corporation, Chicago, Ill., a corporation of Illinois Application February 5, 1951, Serial No. 209,503

1 Claim. (Cl. 137—219)

This invention relates generally to valves or like devices for controlling flow of various fluids.

It is an object of this invention to provide a flow control device which may be operated by remote control.

Another object of this invention is to provide a flow control device which can be used for controlling the flow of fluids over a wide range of pressures without chattering or serious water hammer.

Another object of this invention is to provide a novel type of valve or flow control device making use of flow from the inlet side to supply the power required to effect a closure of the valve.

Another object of this invention is to provide a device in which only negligible energy is required for its operation.

A further object of this invention is to provide a valve which can be made in large sizes and which will make possible rapid shutoff without mechanisms such as supplemental motor operators.

Additional objects of the invention will appear from the following description in which the preferred embodiment has been set forth in detail in conjunction with the accompanying drawings.

Referring to the drawings:

Figure 1 is a cross-sectional view of my hydraulically operated valve in closed position.

Figure 2 is a cross-sectional view showing my hydraulically operated valve in open position.

Figure 3 is an end view of the valve illustrated in Figures 1 and 2; and

Figure 4 is a cross-sectional view taken along the line 4—4 of Figure 2.

The fluid flow control device illustrated in the drawings includes a body 10 which is formed to provide fluid passages 11 and 12. Passage 11 in this instance is an inlet passage and it is intended to be coupled to suitable piping which in turn connects with the source of fluid under pressure. Passage 12 is an outlet passage and it is intended to be coupled to a pipe into which fluid is to be discharged.

Within the body 10 there is a barrier 13 which is centrally aligned within the passage 12 and which is supported from the walls of the passage 12 by the webs 14. The outer walls of the barrier 13 are contoured to permit the flow of fluid therearound and to reduce to a minimum any interference with the flow of the fluid through the body 10.

The barrier 13 is provided with an open-ended recess 16 which is adapted to house the means for operating a sleeve valve member 17. The sleeve valve member 17 is adapted to move longitudinally with respect to the body 10 and is coaxially aligned therewith. The exterior of the sleeve valve member 17 slidably engages a machined inner wall portion 18 in the passage 11. As indicated, the wall 18 is provided with an annular groove 19 which supports an O-ring 21. O-ring 21 engages the outer wall of the sleeve 17 and, as is well known to those familiar with devices of this kind, prevents passage of fluid between the valve body 10 and the outer wall of the sleeve valve 17.

The annular lip 22 on the sleeve valve 17 is adapted to engage a valve seat 23 which is supported by the barrier 13 as indicated. The valve seat 23 is provided with an insert 24 formed of rubber or other suitable material against which the edge 22 of the valve member 17 may engage. When the annular lip 22 and the seat 23 are in engagement, the passage of fluid therebetween is prevented.

The seat 23 is provided with a centrally aligned orifice within which shaft 26 is slidably mounted for longitudinal movement with respect thereto. One end of the shaft 26 supports the sleeve valve member 17 which is provided with the radial webs 27 while the other end of the shaft 26 is provided with a piston-like member 28.

The orifice within the valve seat 23 is provided with a groove 31 which supports an O-ring 32, preventing the flow of fluid between the shaft 26 and the seat 23. The walls of the cavity 16 may either be machined to provide a smooth inner cylindrical surface 36 or they may be provided with a liner 37 within which the piston 28 reciprocates. In the event a liner 37 is used, annular groove 38 provides a seat for an O-ring 39 to prevent the passage of fluid between the liner 37 and the walls of the cavity 16.

As indicated, piston 28 is provided with annular groove 41 which accommodates an O-ring 42. Both the O-ring 42 and the piston 28 are adapted to reciprocate within the cylindrical liner 37 which is retained against longitudinal movement by a shoulder 43 in the cavity 16 at one end and by the shoulder 44 upon the valve seat 23. Spring 46 normally urges the piston 28 to the extreme right as illustrated in Figure 1, thereby causing the annular lip 22 on the sleeve valve 17 to engage the valve seat 23.

The insert 37 is provided with an orifice 47 which is in registry with an annular groove 48 in the body 10 which communicates with a fluid passage 49 terminating in a threaded cavity 51. That portion of the cavity 16 beyond the piston 28 is in communication with a tapped cavity 52 through a fluid passage 53 which is drilled in the valve body.

The valve body 10 is also provided with a tapped cavity 54 whose purpose will more fully hereinafter be explained.

Operation of the device may briefly be described as follows: The valve body 10 is suitably connected to inflow and outflow piping by means of bolts which may be passed through the flanges 10a and 10b. As has previously been indicated the inlet passage 11 is coupled to a pipe which in turn connects with a source of fluid under pressure while the outflow opening 12 connects to a suitable outflow piping.

Conduit 56 provides communication between the fluid under pressure within the inflow passage 11, whereby the fluid communicates through the conduit 56, passage 49, annular groove 48 and orifice 47 into the area within the barrier 13 between the valve seat 23 and the piston 28. As has previously been pointed out, the spring 46 normally urges the piston 28 to the position illustrated generally in Figure 1 with the result that the lip 22 upon the sleeve valve 17 engages the insert 24 of the valve seat 23, thereby preventing the passage of fluid through the valve body. The fluid from the inlet passage 11 operates against the piston face 28a tending to retain the sleeve valve 17 in this position. The valve may thus be said to be in closed position. The flow of fluid through the valve is prevented by the operation of the O-ring 21 against the groove 19 and the outer circumferential wall 18 in the member 17 and also by the tight contact established between the annular lip 22 and the valve seat nsert 24. Passage of liquid between the valve seat member 23 and the longitudinally movable shaft 26 is prevented by the O-ring 32 in the groove 31. In addition, it is evident that no fluid will escape from within the cavity 16 inasmuch as O-rings 39 and 42 provide an effective seal against the passage of fluid.

A conduit 57 is connected to a suitable source of fluid under pressure. By operation of a hand valve, solenoid operated valve or other means, fluid under pressure may be introduced into that portion of the cavity 16 adjacent face 28b of the piston 28. When the pressure of the fluid on face 28b exceeds the pressure of the fluid operating against face 28a and the effect of the spring 46, the piston 28 will be moved to the left, as illustrated in Figure 2, with the result that the sleeve valve 17 will likewise be moved to the left. Lip 22 will be caused to move away from the valve seat insert 24 and the passage of liquid from the fluid passage 11, between the lip 22 and the valve seat 24, around the barrier 13 and through the outlet passage 12 will be accomplished. By actuating the valve 58, the pressure against surface 28b may be released or vented to the atmosphere with the result that the fluid pressure against the surface 28a, together with the spring 46, will urge the piston 28 to the right closing the valve 17.

We claim:

In a fluid control device, a housing having aligned flow passages for connection with associated piping, a body disposed within said housing, webs securing the body to the housing, the body being dimensioned to provide a flow passage about the same and connecting the first named passages, a central bore formed in the body and aligned with the first named passages, a cylindrical liner removably inserted in the bore, means including a resilient seal ring for forming a seal between the liner and the body, an annular groove in said bore, an orifice in said liner in registry with said annular groove, a valve seat fitting threaded into said bore in said body to retain said liner within said bore, an annular seat insert carried by the outer margin of said valve seat fitting and facing the opening of one of the first named passages, a piston fitted within said liner, a resilient seal ring carried by said piston forming a seal between the piston and the liner, a piston rod secured to the piston and extending through a central bore in said valve seat fitting, resilient sealing means mounted in said last named central bore for forming a seal between the piston rod and the valve seat fitting, a spring carried by said poston rod and engaging said piston and said valve seat fitting, a cylindrical valve working surface formed in one of said flow passages within said housing, a cylindrical sleeve valve secured to the free end of said piston rod and slidably mounted within said cylindrical valve working surface, said valve seat fitting having a maximum outer diameter substantially the same as the inner diameter of said cylindrical valve working surface so that said valve seat fitting may be unscrewed from the body and removed from the housing after the sleeve valve has been removed, the valve seat fitting being removed as a part of a subassembly consisting of the piston rod, valve seat fitting, spring and piston, said liner having a maximum outer diameter less than the inner diameter of said cylindrical valve working surface to allow its removal from the housing, resilient sealing means for forming a seal between the sleeve valve and the housing, an annular lip on said sleeve valve for engaging the valve seat insert carried by said valve seat fitting, the annular lip coming in contact with said valve seat insert when said sleeve valve is in the valve closed position, said sleeve valve in the valve open position maintaining a spaced relationship from the annular seat insert, a passage in said housing for conveying fluid pressure into said bore in said body to move said piston toward a valve open position, and additional passages in said body for allowing pressure fluid flowing through said device to force said sleeve valve toward a valve closed position, one of said last named passages terminating in the annular groove formed in the bore of said body, said spring carried by said piston rod serving to force said sleeve valve toward a valve closed position.

References Cited in the file of this patent

UNITED STATES PATENTS

| 1,362,331 | Larner | Dec. 14, 1920 |
| 1,999,496 | Adams | Apr. 30, 1935 |
| 2,519,541 | Bryant | Aug. 22, 1950 |

FOREIGN PATENTS

| 488,748 | France | July 19, 1918 |
| 517,386 | France | Dec. 17, 1920 |